United States Patent
Chaoweeraprasit et al.

(10) Patent No.: US 10,417,327 B2
(45) Date of Patent: Sep. 17, 2019

(54) INTERACTIVE AND DYNAMICALLY ANIMATED 3D FONTS

(71) Applicant: Microsoft Technology Licensing, LLC, Redmond, WA (US)

(72) Inventors: Worachai Chaoweeraprasit, Redmond, WA (US); Richard Kirkpatrick Manning, Redmond, WA (US); Simon Young Tao, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/582,036

(22) Filed: Apr. 28, 2017

(65) Prior Publication Data

US 2018/0190004 A1    Jul. 5, 2018

Related U.S. Application Data

(60) Provisional application No. 62/440,666, filed on Dec. 30, 2016.

(51) Int. Cl.
*G06T 15/00* (2011.01)
*G06F 17/27* (2006.01)

(52) U.S. Cl.
CPC .................. *G06F 17/2705* (2013.01)

(58) Field of Classification Search
USPC ................................................ 345/419, 473
See application file for complete search history.

(56) References Cited

U.S. PATENT DOCUMENTS

| | | | |
|---|---|---|---|
| 6,373,483 B1 * | 4/2002 | Becker | G06T 11/206 345/419 |
| 6,404,435 B1 | 6/2002 | Miller et al. | |
| 6,504,545 B1 | 1/2003 | Browne et al. | |
| 6,512,522 B1 * | 1/2003 | Miller | G06T 11/203 345/474 |
| 7,009,611 B2 | 3/2006 | Di Lelle | |
| 7,265,755 B2 * | 9/2007 | Peterson | G06T 11/206 345/440 |
| 8,095,366 B2 | 1/2012 | Johnson et al. | |
| 8,542,237 B2 | 9/2013 | Pahud et al. | |

(Continued)

OTHER PUBLICATIONS

Fluckiger, et al., "LAIKA—a dynamic typeface", http://www.laikafont.ch/, Published on: Sep. 12, 2015, 3 pages.

(Continued)

*Primary Examiner* — Kimbinh T Nguyen
(74) *Attorney, Agent, or Firm* — Arent Fox LLP

(57) ABSTRACT

Methods and devices for rendering interactive three-dimensional (3D) fonts may include receiving, at a text platform component executing on a computing device, a request from an application to render text. The methods and devices may include parsing the text to identify at least one glyph in the text. The methods and devices may include accessing a font file that includes a 3D glyph description associated with the at least one glyph and an interaction policy associated with the 3D glyph that determines when and how to animate the 3D glyph. The methods and devices may include rendering at least one 3D glyph based on the 3D glyph description and the interaction policy. The methods and devices may include transmitting at least one rendered 3D glyph.

20 Claims, 4 Drawing Sheets

(56) References Cited

U.S. PATENT DOCUMENTS

| | | | |
|---|---|---|---|
| 8,732,621 B2 | 5/2014 | Chu et al. | |
| 9,805,491 B2* | 10/2017 | Herman | G06T 13/20 |
| 2003/0107567 A1* | 6/2003 | Arvin | G06F 3/04845 |
| | | | 345/419 |
| 2003/0110450 A1 | 6/2003 | Sakai | |
| 2004/0090472 A1* | 5/2004 | Risch | G06F 17/30716 |
| | | | 715/853 |
| 2004/0189643 A1* | 9/2004 | Frisken | G06T 11/203 |
| | | | 345/467 |
| 2005/0270290 A1 | 12/2005 | Liu et al. | |
| 2006/0227142 A1 | 10/2006 | Brown et al. | |
| 2006/0275070 A1* | 12/2006 | Shimizu | B41J 11/0095 |
| | | | 400/605 |
| 2011/0115797 A1* | 5/2011 | Kaplan | G06T 11/203 |
| | | | 345/467 |
| 2011/0156867 A1* | 6/2011 | Carrizo | G06K 9/00167 |
| | | | 340/5.85 |
| 2011/0175905 A1* | 7/2011 | Hao | G06T 11/206 |
| | | | 345/419 |
| 2013/0050215 A1 | 2/2013 | Xu et al. | |
| 2014/0085311 A1 | 3/2014 | Gay et al. | |
| 2014/0231510 A1* | 8/2014 | Simske | G06Q 30/0201 |
| | | | 235/380 |
| 2017/0187712 A1* | 6/2017 | Carrizo | H04L 63/0861 |

OTHER PUBLICATIONS

Lewis, et al., "ActiveText: A Method for Creating Dynamic and Interactive Texts", In Proceedings of the 12th annual ACM symposium on User interface software and technology. Nov. 7, 1999, pp. 131-140.

Spencer, Mark, "Creating Fonts for 3D in FCP X and Motion with Glyphter", http://www.provideocoalition.com/creating-symbol-fonts-for-3d-in-fcp-x-and-motion/, Published on: Jul. 2, 2015, 6 pages.

"OpenType specification", https://www.microsoft.com/en-us/Typography/OpenTypeSpecification.aspx, Published on: Dec. 2, 2016, 7 pages.

* cited by examiner

INTERACTIVE AND DYNAMICALLY ANIMATED 3D FONTS

RELATED APPLICATION

This application claims priority to U.S. Application No. 62/440,666 titled "Interactive and Dynamically Animated 3D Fonts," filed Dec. 30, 2016, which is incorporated herein by reference in its entirety.

BACKGROUND

The present disclosure relates to three dimensional (3D) fonts, and more particularly, to use of 3D fonts on a computer device.

Fonts define the visual appearance of text glyphs, which have typically been static two dimensional (2D) definitions, or more recently 2D definitions with pre-defined animations. The appearance of text is generally defined by font files (e.g., Calibri, Arial). To this day, fonts only define a 2D appearance (either static or with pre-defined animations). For each text glyph, there is no interactive or three dimensional (3D) behavior. Applications are free to manipulate and animate text themselves, such as changing the color or spinning each letter. Applications can also make the text appearance change dynamically depending on real time inputs, such as mouse/touch, accelerometer, and other sensors. However, this behavior is completely defined and controlled by the application. In addition, applications must use a separate 3D rendering system to display 3D text. Thus, 3D assets are packaged separately from the font data, generally, within the application.

Currently, there is no standard way to represent or transmit 3D animation or dynamic rendering data for text, meaning that every application must build its own proprietary system for rendering interactive text. For applications that share raw text (e.g., a string of characters without additional markup or metadata) with other applications, such as messaging services that follow an open standard (e.g., SMS), or copy+paste clipboard scenarios in any operating system, there is no way to represent additional rendering information in the raw text string. As such, the richer appearance and animations are lost when viewing the content in a third party application.

Thus, there is a need in the art for improvements in 3D fonts.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

One example implementation relates to a computer device. The computer device may include a memory to store data and instructions, a processor in communication with the memory, an operating system in communication with the memory and processor. The processor may be operable to receive a request from an application to render text, parse the text to identify at least one glyph in the text, access a font file that includes a three-dimensional (3D) glyph description associated with at least one glyph and an interaction policy associated with the 3D glyph that determines when and how to animate the 3D glyph, render at least one 3D glyph based on the 3D glyph description and the interaction policy, and transmit at least one rendered 3D glyph.

Another example implementation relates to a method for rendering text. The method may include receiving, at a text platform component executing on a computing device, a request from an application to render text. The method may also include parsing the text to identify at least one glyph in the text. In addition, the method may include accessing a font file that includes a three-dimensional (3D) glyph description associated with the at least one glyph and an interaction policy associated with the 3D glyph that determines when and how to animate the 3D glyph. The method may include rendering at least one 3D glyph based on the 3D glyph description and the interaction policy. The method may also include transmitting at least one rendered 3D glyph.

Another example implementation relates to computer-readable medium storing instructions executable by a computer device. The computer-readable medium may include at least one instruction for causing the computer device to receive a request from an application to render text. The computer-readable medium may include at least one instruction for causing the computer device to parse the text to identify at least one glyph in the text. The computer-readable medium may include at least one instruction for causing the computer device to access a font file that includes a three-dimensional (3D) glyph description associated with the at least one glyph and an interaction policy associated with the 3D glyph that determines when and how to animate the 3D glyph. The computer-readable medium may include at least one instruction for causing the computer device to render at least one 3D glyph based on the 3D glyph description and the interaction policy. The computer-readable medium may include at least one instruction for causing the computer device to transmit at least one rendered 3D glyph.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

The present disclosure provides systems and methods for defining interactive 3D fonts, and for use of 3D fonts on a computer device. The systems and methods may provide additional animation, interactivity, and richer appearance data for 3D assets into the font file itself. Thus, providing a consistent way to represent and transmit the additional data for the 3D assets across applications and computing devices. The methods and systems may provide a text platform component that interprets and renders the new animations and dynamic data using an existing text stack of the operating system. As such, an individual application needs limited to no code changes to support animations and dynamic rendering of 3D assets, and behavior may be consistent across applications. Interactive 3D fonts may contain a richer and more dynamic definition of text glyph appearance as compared to current solutions. In addition, interactive 3D fonts may include a dynamic animation that responds to input events, such as mouse movement or accelerometer readings.

The systems and methods use 3D assets in a font context and provide the ability to define interactive animations within the font file. While applications previously were able to dynamically change text appearance by, for example, scaling text to be bigger or smaller, the described methods and systems are more efficient by providing the behavior information within the font itself, making the font a stand-alone, complete definition for animating the font. As such, applications that support interactive 3D fonts may consume any third-party interactive 3D font without any additional logic, including the animation and interactive portions of the 3D assets.

Figure 1:
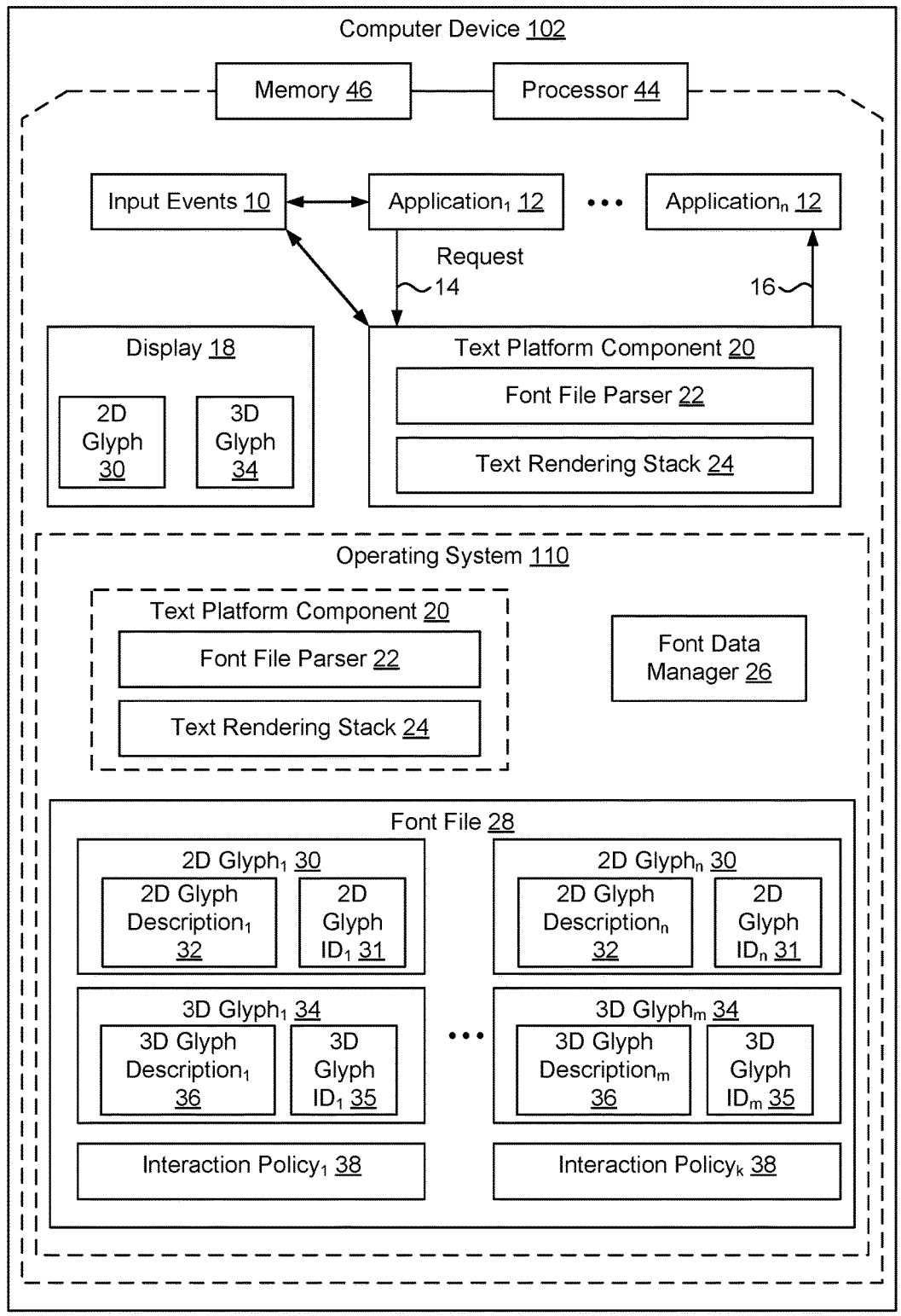
FIG. 1 is a schematic block diagram of an example device in accordance with an implementation of the present disclosure.

Referring now to FIG. 1, an example computer device 102 for use in connection with interactive 3D fonts may include an operating system 110 executed by processor 44 and/or memory 46 of computer device 102. The interactive 3D fonts of the present disclosure may be defined by a font file 28 that defines the properties and behavior of one or more 3D glyphs 34 that make up the interactive 3D font. Each glyph 34 has an appearance, and interactive and/or dynamic behavior, defined by a corresponding 3D glyph description 36 and by one or more corresponding interaction policies 38. Each 3D glyph description 36 includes one or more definitions that define a shape and/or appearance of the respective glyph, while each interaction policy 38 includes one or more rules or definitions that govern an interactive or dynamic behavior associated with one or more glyphs. For example, an 'earth' emoji may have rules that combine the date, time of year, and current weather conditions to determine how to orient the earth model and whether to draw clouds on the surface. Thus, as will be described in more detail herein, the systems and methods of the present disclosure allow a collection of related 3D assets to be grouped and handled in a uniform manner.

Memory 46 of computer device 102 may be configured for storing data and/or computer-executable instructions defining and/or associated with operating system 110, and processor 44 may execute operating system 110. An example of memory 46 can include, but is not limited to, a type of memory usable by a computer, such as random access memory (RAM), read only memory (ROM), tapes, magnetic discs, optical discs, volatile memory, non-volatile memory, and any combination thereof. An example of processor 44 can include, but is not limited to, any processor specially programmed as described herein, including a controller, microcontroller, application specific integrated circuit (ASIC), field programmable gate array (FPGA), system on chip (SoC), or other programmable logic or state machine.

Computer device 102 may include any mobile or fixed computer device, which may be connectable to a network. Computer device 102 may be, for example, a computer device such as a desktop or laptop or tablet computer, a cellular telephone, a gaming device, a mixed reality or virtual reality device, a music device, a television, a navigation system, a camera, a personal digital assistant (PDA), or a handheld device, or any other computer device having wired and/or wireless connection capability with one or more other devices.

In an implementation, applications 12 may send a request 14 to a text platform component 20 to render the text. The text may include 2D glyphs 30 and/or 3D glyphs 34 for presentation on display 18. For example, a user of computer device 102 may present text in a messaging application. The user may input a variety of words to present in a message on display 18, where the characters of the words may include one or more 3D glyphs 34 that represent an interactive and/or dynamic 3D font, as taught by the present disclosure. Also, in some examples, the text of the words may include one or more 2D glyphs 30.

Text platform component 20 may receive one or more input events 10 related to text for presentation on display 18. Input events 10 may include, but are not limited to user input (e.g., touch, mouse, keyboard, panning around a scene, zooming in, zooming out, movement of input devices, screen rotation, multi-touch gestures, or gaze), sensor input (e.g., accelerometers, temperature, light, global positioning system (GPS), time), and/or the presence of typographic characteristics (e.g., font, size, ligatures, control characters, such as Zero Width Joiner). In an implementation, application 12 may receive one or more input events 10 and request 14 may be in response to one or more received input events 10. Application 12 may customize the behavior of the font in response to input events 10. For example, application 12 may disable accelerometer readings based on user preferences. Another example may include application 12 presenting text on a display 18 in response to an input event, such as selecting a button. For example, when a user of computer device 102 selects a purchase button presented by application 12, application 12 may display animated dollar signs (e.g., rotating dollar signs with light playing off of the dollar signs) in response to the selection of the purchase button. Another example may include application 12 presenting 3D icons for a user to select.

Text platform component 20 may be included as part of the operating system 110 of computing device 102. In another implementation, text platform component 20 may be a third-party component that may be used on a plurality of platforms and a variety of computing devices. As such, consistent behavior for the 3D glyphs 34 may be achieved across a variety of applications 12 and/or computing devices.

Text platform component 20 may include a font file parser 22 operable to parse the received text to identify 2D glyphs 30 and 3D glyphs 34 mentioned in the text. For example, font file parser 22 may identify the 2D glyph IDs 31 and 3D glyph IDs 35 associated with the 2D glyphs 30 and 3D glyphs 34. 2D glyph IDs 31 and 3D glyph IDs 35 may include, but are not limited to, a font glyph ID and a corresponding Unicode code point. Text platform component 20 may read one or more font files 28 associated with the identified 2D glyphs 30 and 3D glyphs 34. Font file 28 may include a collection of related 2D glyphs 30 (e.g., 1 to n, where n is an integer) and a collection of related 3D glyphs 34 (e.g., 1 to m, where m is an integer) to be grouped and handled in a uniform way. For example, font file 28 may reference related 3D glyphs 34 using, for example, a 3D glyph ID 35, such as, but not limited to, a font glyph ID or a corresponding Unicode code point for the 3D glyph 34.

For each 3D glyph 34 included in font file 28, a 3D glyph description 36 may be associated with the 3D glyph 34.

Figure 2:
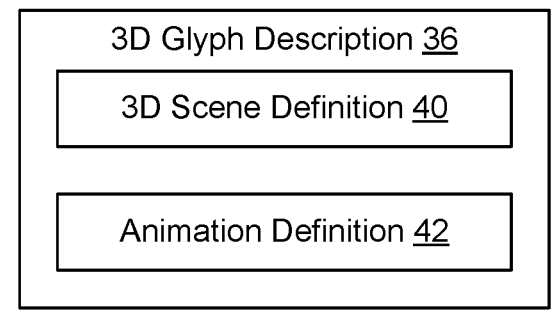
FIG. 2 is an example of a three dimensional glyph description in accordance with an implementation of the present disclosure.

Referring now to FIG. 2, an example 3D glyph description 36 may include a 3D scene definition 40 for rending the glyph as a 3D object. 3D scene definition 40 may include, but are not limited to, 3D geometry, 3D meshes, textures, lighting, shaders, and camera position. A richer animation and interactivity may be achieved for the 3D glyph 34 by using the 3D scene definitions 40 when rendering the 3D glyph 34. 3D scene definitions 40 may be shared by a plurality of 3D glyphs 34 within a font file 28. For example, the same material property or texture, e.g., a "metallic" material, may be used by multiple glyphs within the same font, or the same object, graphic, or item, e.g., a "hat," may be worn by many glyphs. Thus, due to the sharing of 3D scene definitions 40, a collection of 3D glyphs 34 in a font may use a smaller amount of memory than the combination of all loose 3D assets.

3D glyph description 36 may also include an animation definition 42 for animating the 3D glyph 34. Information included in animation definition 42 may include, but is not limited to, key frames, animation curves, animation rigs, and other animation primitives and timing data that would be used to describe a 2D or 3D animation. Key frames may include frames of animation sequences that define the beginning and end of an animation. Animation curves may include interpolating a variable between an initial and final value, for example, by linearly changing the variable by the same amount per unit of time or using an easing function that may include a fast initial change with slower changes towards the end as the variable eases into a final form. An example animation rig may include a skeleton (e.g., a 3D structure) onto which 3D meshes and textures may be mapped where parts of the skeleton may be animated through 3D space. Multiple animations may be defined for a 3D glyph 34. In addition, animation definitions 42 may be shared among 3D glyphs 34, thereby reducing memory usage and allowing for better reuse within the font.

Referring back to FIG. 1, each 3D glyph 34 may be associated with one or more interaction policies 38 (e.g., 1 to k, where k is an integer) that describes conditions, rules and/or definitions that govern an interactive or dynamic behavior associated with one or more 3D glyphs 34. Interaction policies 38 may be based on one or more input events 10 that may trigger the animation of 3D glyphs 34 and may fully define the behavior of 3D glyphs 34 in response to one or more input events 10. For example, interaction policy 38 may define what part of the 3D glyph 34 may change and/or respond to an input event 10. In one example, interaction policy 38 may define how a feature of the 3D glyph 34, such as "eyes" of the 3D glyph 34, can move in response to changes in a mouse input, e.g., the "eyes" may track the movement of the mouse. In another example, interaction policy 38 may define how an appearance of the 3D glyph 34 responds to changes in ambient light sensors.

By using interaction policies 38, 3D assets in font file 28 may react in a uniform manner to global system events (e.g., screen rotation, change in lighting, multi-touch gesture, or gaze) without explicit involvement by applications 12. Thus, the salient behavior and appearance for 3D glyphs 34 may be fully defined within font file 28 enabling a consistent way to represent and transmit 3D assets across multiple applications 12 and computing devices. Moreover, having uniform access across related 3D glyphs 34 in the font file 28 allows an opportunity for system-level caching so the same content is not redundantly processed over time.

Additionally, because different 3D glyphs 34 in a font may have different semantic identity (e.g., a sad face vs. a happy face), when a 3D glyph 34 is put in a context, inter-glyph interactivity may be conceived. This effect may be hard to achieve through custom application usage of loose 3D assets due to the lack of designated known semantics.

Operating system 110 may include a font data manager 26 operable to manage one or more font files 28 on operating system 110. In an implementation, font data manager 26 may also create and/or define 2D glyph descriptions 32, 3D glyph descriptions 36, and/or interaction policies 38. In addition, font data manager 26 may be used to change and/or update font files 28. In another implementation, 2D glyph descriptions 32, 3D glyph descriptions 36, and interaction policies 38 may be pre-loaded on operating system 110. Thus, font file 28 may be pre-defined when the operating system 110 is loaded onto computer device 102. Font data manger 26 may communicate any updates and/or changes to font file 28.

Text platform component 20 may read the associated 2D glyph descriptions 32, 3D glyph descriptions 36, and the interaction policies 38 from font file 28 in response to the font file parser 22 identifying the 2D glyphs 30 and 3D glyphs 34 in the text.

Text platform component 20 may also include a text rendering stack 24 to render the 2D glyphs 30 based on the 2D glyph descriptions 32 for presentation on display 18. Text rending stack 24 may also render the 3D glyphs 34 based on the 3D glyphs description 36 and interaction policy 38 received from font file 28 in real-time or near real-time. Text platform component 20 may transmit the rendered 3D glyphs 34 to applications 12 for presentation on display 18. Because the 3D glyphs 34 are rendered in real-time or near real-time by text platform component 20, the 3D glyph 34 presented on display 18 may be animated and/or interactive based on the received input events 10. For example, a face may be animated to smile and/or frown in response to various input events.

By having the behavior information for animating and defining the 3D glyphs 34 stored within font file 28, font file 28 may be a standalone, complete definition for the 3D glyphs 34. As such, applications 12 that support interactive 3D fonts may be able to consume any third-party interactive 3D font without needing any additional logic, including the animation and interactive portions. Moreover, data-exchange protocols, for example, in messaging applications, may be simplified provided that both the sender and receiver may access the same font. In the event that the same font may not be accessed by the receiving party, a fallback policy may be adopted that preserves content without providing the 3D information and/or animation. For example, one or more alternate font choices may be provided for use in the event that the interactive 3D fonts may not be accessed by the receiving party.

Figure 3:
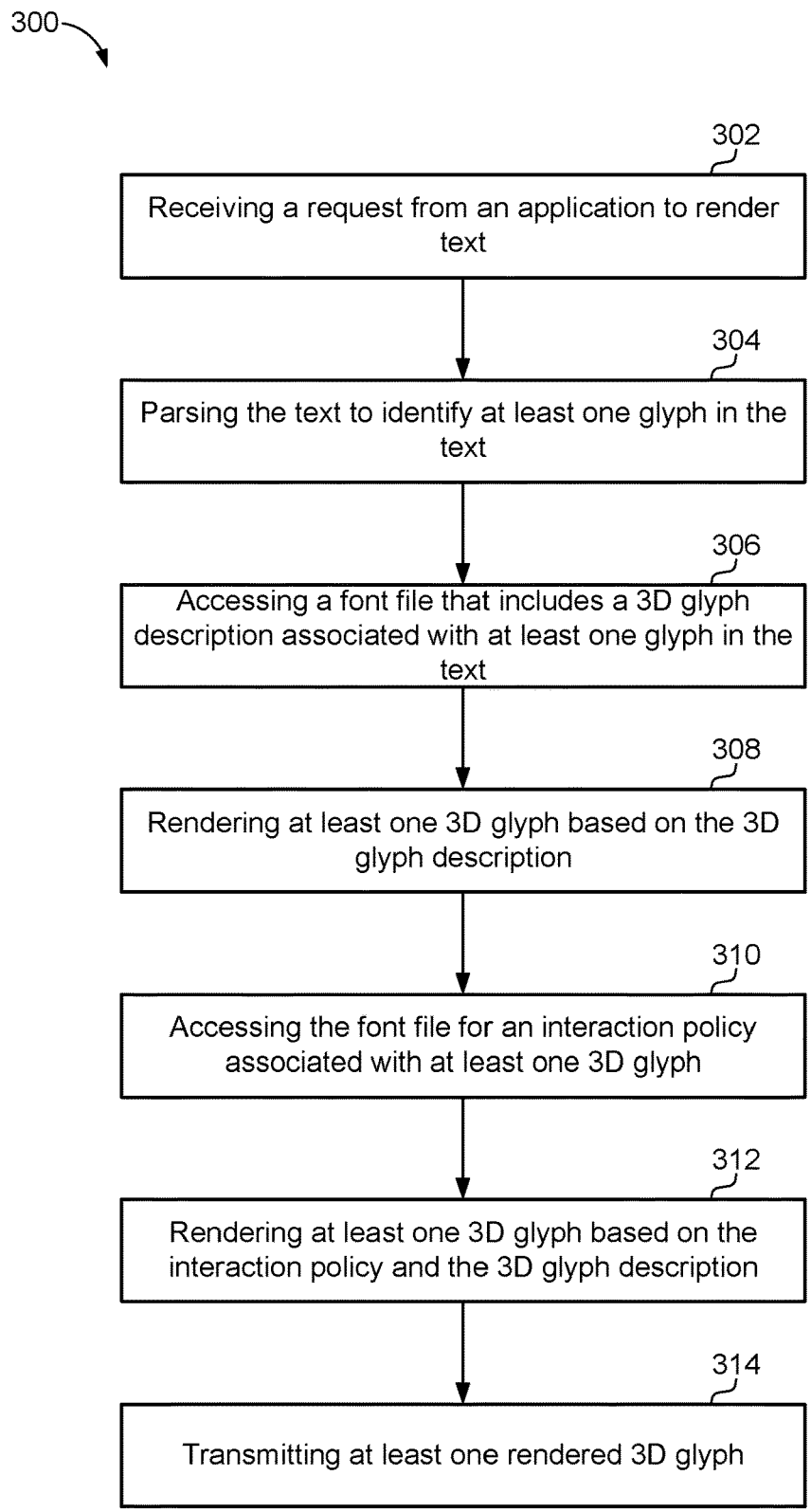
FIG. 3 is a flow chart of a method for rendering text in accordance with an implementation of the present disclosure.

Referring now to FIG. 3, an example method flow 300 is illustrated for rendering text that may be executed by a text platform component 20 (FIG. 1) in communication with an operating system 110 (FIG. 1) on computer device 102 (FIG. 1).

At 302, method 300 may include receiving a request from an application to render text. For example, text platform component 20 may receive a request 14 (FIG. 1) from application 12 (FIG. 1) to render text. The text may include at least one 3D glyph 34 (FIG. 1) to present on display 18 (FIG. 1). In addition, in some cases, the text may also include at least one 2D glyph 30 (FIG. 1) to present on display 18. Text platform component 20 may also receive one or more input events 10 (FIG. 1) associated with the text. Input events may include, but are not limited to, user input (e.g., touch, mouse, keyboard input, panning around a scene, zooming in, zooming out, movement of input devices, screen rotation, multi-touch gestures, or gaze), sensor inputs (e.g., accelerometers, temperature, lighting, time, GPS), and the presence of typographic characteristics (e.g., font, size, ligatures, control characters). In an implementation, application 12 may receive one or more input events 10 associated with the text and request 14 may also include the one or more input events 10 associated with the text.

At 304, method 300 may include parsing the text to identify at least one glyph to render. Text platform component 20 may parse the received text to identify individual glyphs to render in the text.

At 306, method 300 may include accessing a font file that includes a 3D glyph description associated with at least one glyph in the text. Font file 28 may include a plurality of related 3D glyphs and may reference related 3D glyphs 34 using, for example, a font glyph ID or a corresponding Unicode code point for the 3D glyph 34. For each 3D glyph 34 included in font file 28, a 3D glyph description 36 may be associated with the 3D glyph 34. Text platform component 20 may match the 3D glyph descriptions 36 to each of the glyphs within the text.

The 3D glyph description 36 may include a 3D scene definition 40 for the at least one 3D glyph 34. 3D scene definitions 40 may include, but are not limited to, 3D geometry, 3D meshes, textures, lighting, shaders, and camera position. In addition, the 3D glyph description 36 may include an animation definition 42 for animating the 3D glyph 34. Information included in the animation definition 42 may include, but is not limited to, key frames, animation curves, animation rigs, and other animation primitives and timing data that would be used to describe a 2D or 3D animation. For example, text platform component 20 may access font file 28 (FIG. 1) for the 3D glyph descriptions 36 associated with the at least one 3D glyph 34 identified in the text.

In an implementation, font file 28 may apply the same 3D glyph descriptions 36 to a plurality of 3D glyphs so 3D glyphs within the same font file 28 may reuse the same 3D glyph descriptions. For example, the same "metallic" material may be used by multiple glyphs within the same font. By reusing 3D glyph descriptions within the font file, allows for system-level caching to reduce the redundant processing of content over time. Moreover, by grouping related 3D glyphs into a single font file, a smaller disk size may be provided instead of the combination of loose 3D assets.

At 308, method 300 may include rendering at least one 3D glyph based on the 3D glyph description. For example, text platform component 20 may render 3D glyph 34 based on the 3D glyph description 36 accessed from font file 28. For instance, text platform component 20 may render features of 3D glyph 34 based on the 3D scene definition 40 and/or animation definition 42. In some implementations, the rendering may occur in real-time or near real-time, which allows the 3D glyph 34 to interact based on the received input events 10. Because the rendering may occur in real-time or near real-time, the rendered 3D glyph 34 may be text resolution (e.g., the resolution of the text on a display at a given zoom level) independent.

At 310, method 300 may include accessing the font file for an interaction policy associated with at least one 3D glyph. For example, font file 28 may also include an interaction policy 38 that defines conditions when animations may be applied to the 3D glyphs 34. Animations may be applied in response to one or more input events 10. Interaction policy 38 may provide a uniform manner in which 3D glyphs 34 respond to input events (e.g., screen rotation, change in lighting, multi-touch gestures or gaze) without explicit involvement from application 12. In addition, because a 3D glyph 34 may have different semantic identities (e.g., a sad face vs. a happy face) when certain input events 10 are occurring, interaction policies 38 may define when to use the various semantic identities.

At 312, method 300 may include rendering at least one 3D glyph based on the interaction policy and the 3D glyph description. For example, text platform component 20 may render the 3D glyph 34 based on interaction policy 38 from font file 28 and the 3D glyph description 36. In some implementations, the rendering may be in real or near real-time. By applying the interaction policy 38 to the real time or near-real time rendering of the 3D glyph 34, the 3D glyph 34 may interact based on the received input events 10. For example, a user may zoom in or zoom out on the 3D glyph and the rendering of the 3D glyph may update based upon the zoom. A user may also pan around the scene and the presented 3D glyph 34 may update based on the user input. Another example may include features of the 3D glyph 34, e.g., the eyes of a smiley face glyph, to track the movement of a mouse. Yet another example may include determining when a face feature of the 3D glyph 34 should smile or frown in response to various inputs. Another example may include receiving input event 10 in the form of a sensor input of a level of ambient light in a room surrounding computing device 102, and in response animating the 3D glyph 34 based upon the level of brightness detected in the room.

At 314, method 300 may include transmitting at least one rendered 3D glyph. For example, text platform component 20 may transmit rendered 3D glyph 34 to display 18 for presentation on display 18. Thus, the rendered 3D glyph 34 may be presented on display without a need for additional logic within the application 12. In addition, text platform component 20 may transmit the rendered 3D glyph 34 to application 12. Application 12 may transmit the rendered 3D glyph 34 to display 18. Application 12 may also perform further processing of the rendered 3D glyph 34 (e.g., applying a 3D perspective) before transmitting the rendered 3D glyph 34 to display 18. Additionally, application 12 may not transmit the rendered 3D glyph 34 to display 18.

As such, applications 12 that support interactive 3D fonts may be able to consume any third-party interactive 3D font configured according to the structure defined herein without needing any additional logic, including the animation and interactive portions. Moreover, data-exchange protocols, for example, in messaging applications may be simplified provided that both the sender and receiver may access the same font.

Figure 4:
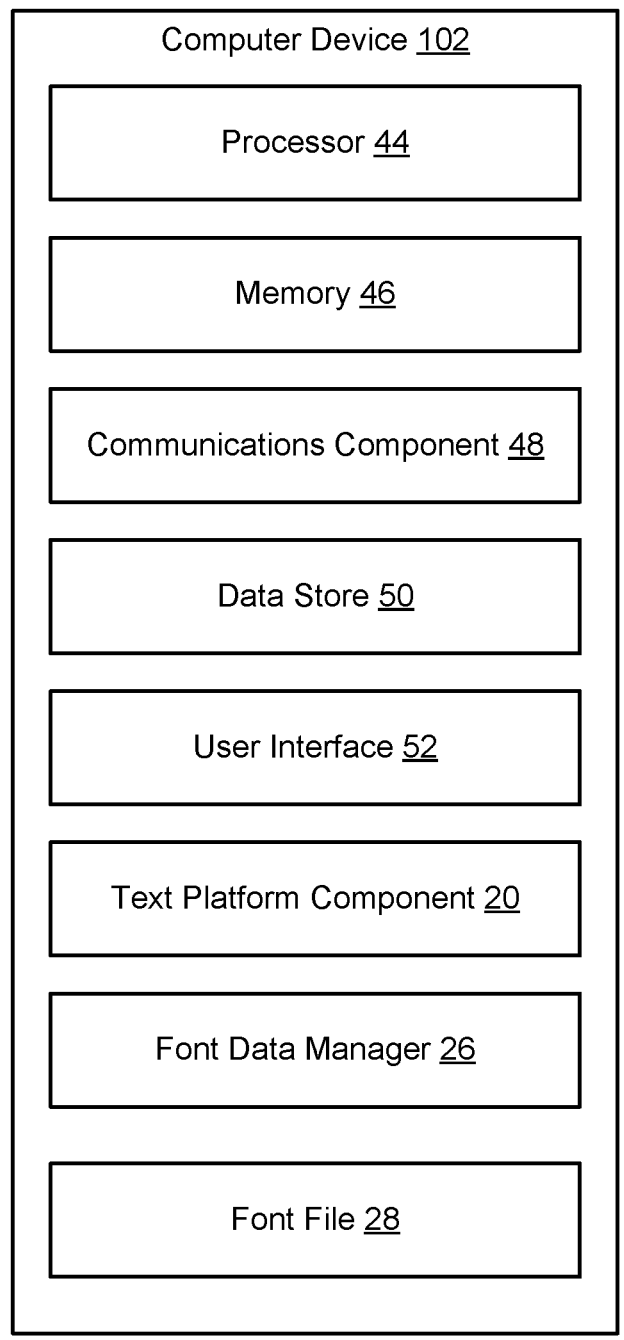
FIG. 4 is a schematic block diagram of an example device in accordance with an implementation of the present disclosure.

Referring now to FIG. 4, illustrated is an example computer device 102 in accordance with an implementation, including additional component details as compared to FIG. 1. In one example, computer device 102 may include processor 44 for carrying out processing functions associated with one or more of components and functions described herein. Processor 44 can include a single or multiple set of processors or multi-core processors. Moreover, processor 44 can be implemented as an integrated processing system and/or a distributed processing system.

Computer device 102 may further include memory 46, such as for storing local versions of applications being executed by processor 44. Memory 46 can include a type of memory usable by a computer, such as random access memory (RAM), read only memory (ROM), tapes, magnetic discs, optical discs, volatile memory, non-volatile memory, and any combination thereof. Additionally, processor 44 and memory 46 may include and execute operating system 110 (FIG. 1).

Further, computer device 102 may include a communications component 48 that provides for establishing and maintaining communications with one or more parties utilizing hardware, software, and services as described herein. Communications component 48 may carry communications between components on computer device 102, as well as between computer device 102 and external devices, such as devices located across a communications network and/or devices serially or locally connected to computer device 102. For example, communications component 48 may include one or more buses, and may further include transmit chain components and receive chain components associated with a transmitter and receiver, respectively, operable for interfacing with external devices.

Additionally, computer device 102 may include a data store 50, which can be any suitable combination of hardware and/or software, that provides for mass storage of information, databases, and programs employed in connection with implementations described herein. For example, data store 50 may be a data repository for applications 12 (FIG. 1), font file 28 (FIG. 1), text platform component 20 (FIG. 1), and/or font data manager 26 (FIG. 1).

Computer device 102 may also include a user interface component 52 operable to receive inputs from a user of computer device 102 and further operable to generate outputs for presentation to the user. User interface component 52 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 52 may include one or more output devices, including but not limited to a display, a speaker, a haptic feedback mechanism, a printer, any other mechanism capable of presenting an output to a user, or any combination thereof.

In an implementation, user interface component 52 may transmit and/or receive messages corresponding to the operation of text platform component 20, font file 28, font data manager 26, and/or applications 12. In addition, processor 44 executes text platform component 20, font file 28, font data manager 26, and/or applications 12, and memory 46 or data store 50 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various implementations are described herein in connection with a device (e.g., computer device 102), which can be a wired device or a wireless device. A wireless device may be a cellular telephone, a satellite phone, a cordless telephone, a Session Initiation Protocol (SIP) phone, a wireless local loop (WLL) station, a personal digital assistant (PDA), a handheld device having wireless connection capability, a computer device, a mixed reality or virtual reality device, or other processing devices connected to a wireless modem.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A computer device, comprising:
a memory to store data and instructions;
a processor in communication with the memory;
an operating system, in communication with the memory and the processor, wherein the processor is operable to:
receive a request from an application to render text;
parse the text to identify at least one glyph in the text;
access a font file that includes a three-dimensional (3D) glyph description that includes an animation definition for the at least one glyph and an interaction policy associated with the 3D glyph that determines when and how to animate the 3D glyph; and
render at least one 3D glyph based on the 3D glyph description and the interaction policy accessed from the font file.

2. The computer device of claim 1, wherein the processor is further operable to transmit the at least one rendered 3D glyph to a display.

3. The computer device of claim 1, wherein the processor is further operable to transmit the at least one rendered 3D glyph to the application.

4. The computer device of claim 1, wherein the interaction policy is based on at least one received input event.

5. The computer device of claim 4, wherein the input event includes one or more of user input, sensor input, and a typographic characteristic.

6. The computer device of claim 4, wherein the interaction policy provides a uniform manner for the at least one glyph to respond to the at least one input event.

7. The computer device of claim 1, wherein the font file includes a plurality of related 3D glyphs and wherein the 3D glyph description and the interaction policy applies to multiple of the plurality of related 3D glyphs.

8. The computer device of claim 1, wherein the 3D glyph description further includes a 3D scene definition.

9. A method for rendering text, comprising:
receiving, at a text platform component executing on a computing, device, a request from an application to render text;
parsing the text to identify at least one glyph in the text;
accessing a font file that includes a three-dimensional (3D) glyph description that includes an animation definition for the at least one glyph and an interaction policy associated with the 3D glyph that determines when and how to animate the 3D glyph; and
rendering at least one 3D glyph based on the 3D glyph description and the interaction policy accessed from the font file.

10. The method of claim 9, further comprising transmitting the at least one rendered 3D glyph to a display.

11. The method of claim 9, further comprising transmitting the at least one rendered 3D glyph to the application.

12. The method of claim 9, wherein the interaction policy is based on at least one received input event.

13. The method of claim 12, wherein the input event includes one or more of user input, sensor input, and a typographic characteristic.

14. The method of claim 12, wherein the interaction policy provides a uniform manner for the at least one 3D glyph to respond to the at least one input event.

15. The method of claim 9, wherein the font file includes a plurality of related 3D glyphs and wherein the 3D glyph description and the interaction policy applies to multiple of the plurality of related 3D glyphs.

16. The method of claim 9, wherein the 3D glyph description further includes a 3D scene definition.

17. A non-transitory computer-readable medium storing instructions executable by a computer device, comprising:
at least one instruction for causing the computer device to receive a request from an application to render text;
at least one instruction for causing the computer device to parse the text to identify at least one glyph in the text;
at least one instruction for causing the computer device to access a font file that includes a three-dimensional (3D) glyph description that includes an animation definition for the at least one glyph and an interaction policy associated with the 3D glyph that determines when and how to animate the 3D glyph; and
at least one instruction for causing the computer device to render at least one 3D glyph based on the 3D glyph description and the interaction policy accessed from the font file.

18. The computer-readable medium of claim 17, wherein the font file includes a plurality of related 3D glyphs and wherein the 3D glyph description and the interaction policy applies to multiple of the plurality of related 3D glyphs.

19. The computer-readable medium of claim 17, wherein the interaction policy is based on at least one received input event.

20. The computer-readable medium of claim 19, wherein the interaction policy provides a uniform manner for the at least one glyph to respond to the at least one input event.

* * * * *